United States Patent
Toyama et al.

(10) Patent No.: US 9,322,932 B2
(45) Date of Patent: Apr. 26, 2016

(54) SCINTILLATOR PANEL AND RADIATION DETECTION DEVICE

(71) Applicant: HAMAMATSU PHOTONICS K.K., Hamamatsu-shi, Shizuoka (JP)

(72) Inventors: Shintaro Toyama, Hamamatsu (JP); Yutaka Kusuyama, Hamamatsu (JP); Masanori Yamashita, Hamamatsu (JP); Hirotake Osawa, Hamamatsu (JP); Katsuhiko Suzuki, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 14/427,433

(22) PCT Filed: Sep. 17, 2013

(86) PCT No.: PCT/JP2013/075034
§ 371 (c)(1),
(2) Date: Mar. 11, 2015

(87) PCT Pub. No.: WO2014/042273
PCT Pub. Date: Mar. 20, 2014

(65) Prior Publication Data
US 2015/0247934 A1    Sep. 3, 2015

(30) Foreign Application Priority Data
Sep. 14, 2012 (JP) ................................. 2012-203196

(51) Int. Cl.
*G01T 1/20* (2006.01)
*G01T 1/202* (2006.01)
*G21K 4/00* (2006.01)

(52) U.S. Cl.
CPC ............. *G01T 1/2002* (2013.01); *G01T 1/202* (2013.01); *G01T 1/2018* (2013.01); *G21K 4/00* (2013.01);

(Continued)

(58) Field of Classification Search
CPC ............................ G01T 1/2002; G01T 1/1644
See application file for complete search history.

(56) References Cited

U.S. PATENT DOCUMENTS

| 6,298,113 | B1 * | 10/2001 | Duclos | G01T 1/2002 |
| | | | | 250/367 |
| 6,743,486 | B1 * | 6/2004 | Miyazawa | B24B 9/14 |
| | | | | 351/159.69 |

(Continued)

FOREIGN PATENT DOCUMENTS

| JP | H07-027863 A | 1/1995 |
| JP | H09-325185 A | 12/1997 |

(Continued)

OTHER PUBLICATIONS

Translation of International Patent Application Publication WO 2010092869 to Nagatomo.*

(Continued)

*Primary Examiner* — Mark R Gaworecki
*Assistant Examiner* — Kenneth J Malkowski
(74) *Attorney, Agent, or Firm* — Drinker Biddle & Reath LLP

(57) ABSTRACT

A scintillator panel for converting radiation into scintillation light, includes a substrate having a front surface and a back surface, a plurality of scintillator sections formed on the front surface of the substrate so as to be separate from one another, and having upper surfaces and side surfaces extending from the upper surfaces toward the front surface of the substrate, solvent permeation blocking film formed on the upper surfaces and the side surfaces of the scintillator sections so as to cover the upper surfaces and the side surfaces of the scintillator sections, and a light shielding layer formed on the solvent permeation blocking film, that is for shielding the scintillation light, and the scintillator section is composed of a plurality of columnar crystals of a scintillator material, the solvent permeation blocking film is formed so as not to fill gaps between the side surfaces of the adjacent scintillator sections.

12 Claims, 7 Drawing Sheets

(52) U.S. Cl.
CPC ........ *G21K 2004/04* (2013.01); *G21K 2004/06* (2013.01); *G21K 2004/10* (2013.01); *G21K 2004/12* (2013.01)

(56) References Cited

U.S. PATENT DOCUMENTS

| | | | | |
|---|---|---|---|---|
| 2003/0178570 | A1* | 9/2003 | Tsunota | G01T 1/2002 250/370.11 |
| 2012/0001078 | A1* | 1/2012 | McEvoy | G01T 1/2002 250/366 |
| 2012/0223239 | A1* | 9/2012 | Bernhardt | G01T 1/2018 250/366 |

FOREIGN PATENT DOCUMENTS

| | | |
|---|---|---|
| JP | 2001-128064 | 5/2001 |
| JP | 2001-283731 A | 10/2001 |
| JP | 2002-131438 A | 5/2002 |
| JP | 2003-167060 A | 6/2003 |
| JP | 2004-012282 | 1/2004 |
| JP | 2004-108806 A | 4/2004 |
| JP | 2011-220774 | 11/2011 |
| JP | 2012-127698 | 7/2012 |
| JP | 2012-128402 | 7/2012 |
| WO | WO-2010/092869 A1 | 8/2010 |

OTHER PUBLICATIONS

English-language translation of International Preliminary Report on Patentability (IPRP) dated Mar. 26, 2015 that issued in WO Patent Application No. PCT/JP2013/075034.

* cited by examiner

SCINTILLATOR PANEL AND RADIATION DETECTION DEVICE

TECHNICAL FIELD

An aspect of the present invention relates to a scintillator panel and a radiation detection device.

BACKGROUND ART

A method for manufacturing a radiation detection device is described in Patent Document 1. In the method described in Patent Document 1, first, a mask is disposed at a front stage of photoelectric conversion elements arrayed on an element base, and a scintillator element is formed on the photoelectric conversion elements by vapor deposition of a scintillator material by use of the mask. Next, a light reflection material is applied or vapor-deposited to the whole of the element. At this time, grooves for separating the scintillator element are filled with the light reflection material. Then, light shielding processing is applied with aluminum foil or the like, to obtain a radiation detection device.

CITATION LIST

Patent Literature

Patent Document 1: Japanese Patent Application Laid-Open No. H9-325185

SUMMARY OF INVENTION

Technical Problem

However, as the method described above, when grooves for separating a scintillator element are filled with a light reflection material (or a light absorbing material), to form a light shielding layer, a solvent or the like contained in the light reflection material (or the light absorbing material) may permeate among a plurality of columnar crystals composing the scintillator element in some cases. In such a case, the characteristics of the scintillator element having deliquescency may be degraded. In particular, in the case where the columnar crystals are made thicker (for example, its film thickness is approximately 500 μm), the gaps among the columnar crystals are likely to be widened, that has caused a problem.

An aspect of the present invention has been achieved in consideration of such circumstances, and an object of the present invention is to provide a scintillator panel and a radiation detection device which are capable of preventing characteristic degradation associated with formation of a light shielding layer.

Solution to Problem

In order to solve the above-described problem, a scintillator panel according to an aspect of the present invention, which is for converting radiation into scintillation light, the scintillator panel includes a substrate having a front surface and a back surface, a plurality of scintillator sections formed on the front surface of the substrate so as to be separate from one another, and having upper surfaces and side surfaces extending from the upper surfaces toward the front surface of the substrate, solvent permeation blocking film formed on the upper surfaces and the side surfaces of the scintillator sections so as to cover the upper surfaces and the side surfaces of the scintillator sections, and a light shielding layer formed on the solvent permeation blocking film, and for shielding scintillation light, and in the scintillator panel, the scintillator section is composed of a plurality of columnar crystals of a scintillator material, the solvent permeation blocking film is formed so as not to fill gaps between the side surfaces of the scintillator sections adjacent to one another, and the light shielding layer is formed on the solvent permeation blocking film on the side surfaces of the scintillator sections so as to fill the gaps.

In this scintillator panel, the plurality of scintillator sections are formed on the substrate so as to be separate from one another, and the solvent permeation blocking film is formed on the side surfaces and the upper surfaces of the respective scintillator sections so as not to fill the gaps among those scintillator sections (among the side surfaces of the scintillator sections). Then, in this scintillator panel, the light shielding layer is formed on the solvent permeation blocking film so as to fill the gaps between the scintillator sections. Accordingly, at the time of forming the light shielding layer so as to fill the gaps between the scintillator sections with a predetermined material, a solvent or the like in the predetermined material does not permeate among the columnar crystals composing the scintillator sections. Therefore, in accordance with this scintillator panel, it is possible to prevent characteristic degradation associated with formation of a light shielding layer.

In a scintillator panel according to an aspect of the present invention, the light shielding layer may be formed on the solvent permeation blocking film on the side surfaces of the scintillator sections, so as to cover the side surfaces of the scintillator sections. In this case, it is possible to securely confine scintillation light to each scintillator section.

In a scintillator panel according to an aspect of the present invention, the light shielding layer may be further formed on the solvent permeation blocking film on the upper surfaces of the scintillator sections, so as to cover the upper surfaces of the scintillator sections. In this case, it is possible to securely confine scintillation light to each scintillator section.

In a scintillator panel according to an aspect of the present invention, a plurality of convex portions projecting from the front surface in a direction from the back surface toward the front surface of the substrate, and concave portion defined by the convex portions may be formed on the substrate, and the scintillator sections may be respectively formed on upper surfaces of the convex portions. In this case, it is possible to form the scintillator sections so as to securely separate from one another.

In a scintillator panel according to an aspect of the present invention, the solvent permeation blocking film may be further formed on side surfaces of the convex portions so as to cover the side surfaces of the convex portions. In this case, it is possible to securely prevent permeation of a solvent among the columnar crystals at the time of forming the light shielding layer.

In a scintillator panel according to an aspect of the present invention, the solvent permeation blocking film may be further formed on a bottom surface of the concave portion so as to cover the bottom surface of the concave portion. In this case, not only is it possible to more securely prevent permeation of a solvent among the columnar crystals, but it is also easier to form the solvent permeation blocking film.

Here, in order to solve the above-described problem, a radiation detection device according to an aspect of the present invention includes the scintillator panel described above, and the substrate is a sensor panel having a plurality of photoelectric conversion elements arrayed so as to be optically coupled to the scintillator sections. Because this radiation detection device includes the scintillator panel described above, it is possible to prevent characteristic degradation associated with formation of a light shielding layer.

Advantageous Effects of Invention

In accordance with an aspect of the present invention, it is possible to provide a scintillator panel and a radiation detection device which are capable of preventing characteristic degradation associated with formation of a light shielding layer.

DESCRIPTION OF EMBODIMENTS

Hereinafter, a scintillator panel according to an embodiment will be described in detail with reference to the drawings. In addition, in the respective drawings, the same or the corresponding portions are denoted by the same reference signs, and overlapping descriptions thereof will be omitted. Scintillator panels according to the following embodiments are for converting incident radiation R such as X-rays into scintillation light such as visible light, and can be used as devices for radiation imaging, for example, in mammography equipment, chest examination equipment, CT devices, dental oral photographic apparatuses, radiation cameras, and the like.

[First Embodiment]

Figure 1:
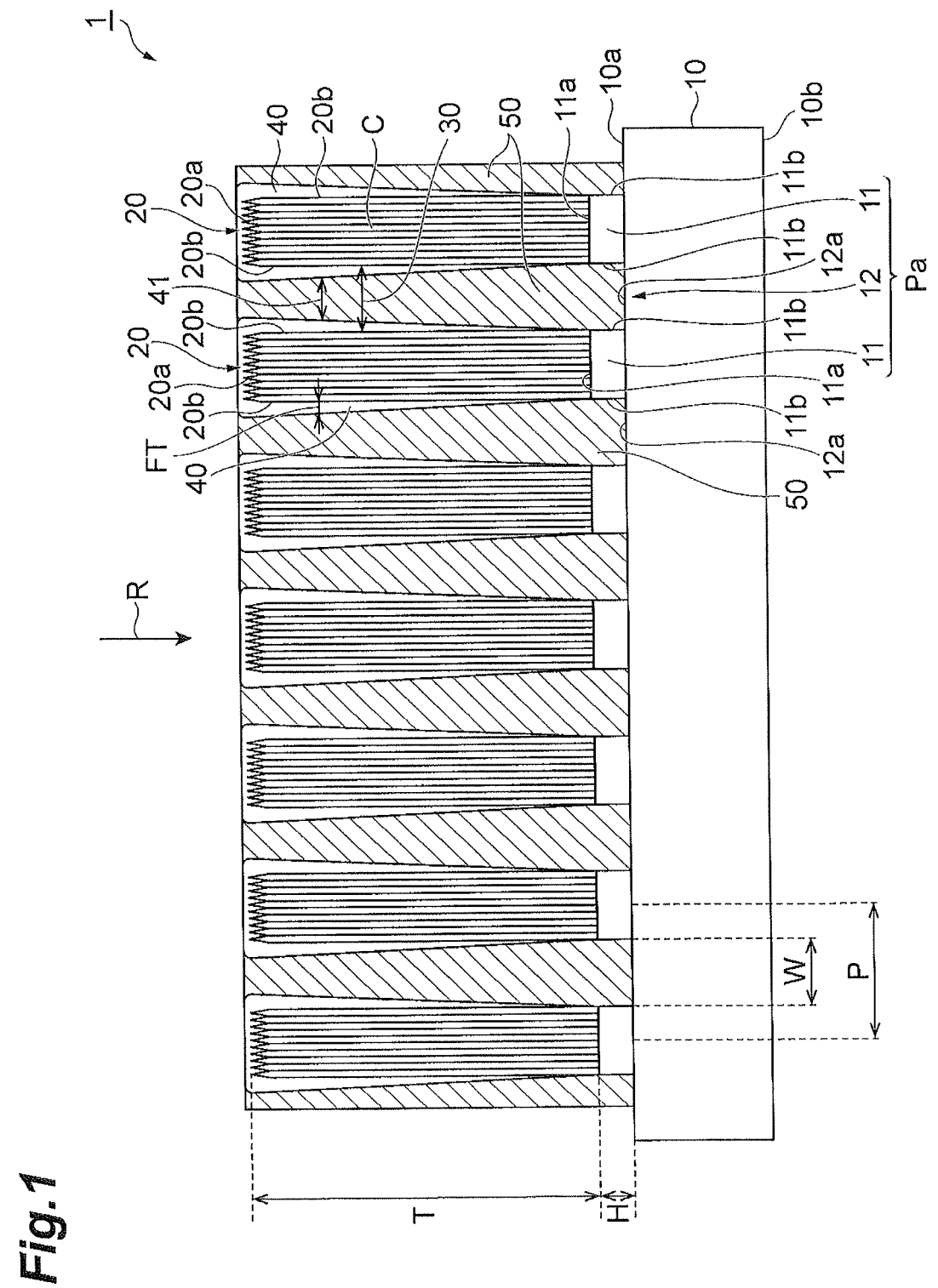
FIG. 1 is a side view of a scintillator panel according to a first embodiment.
Figure 2:
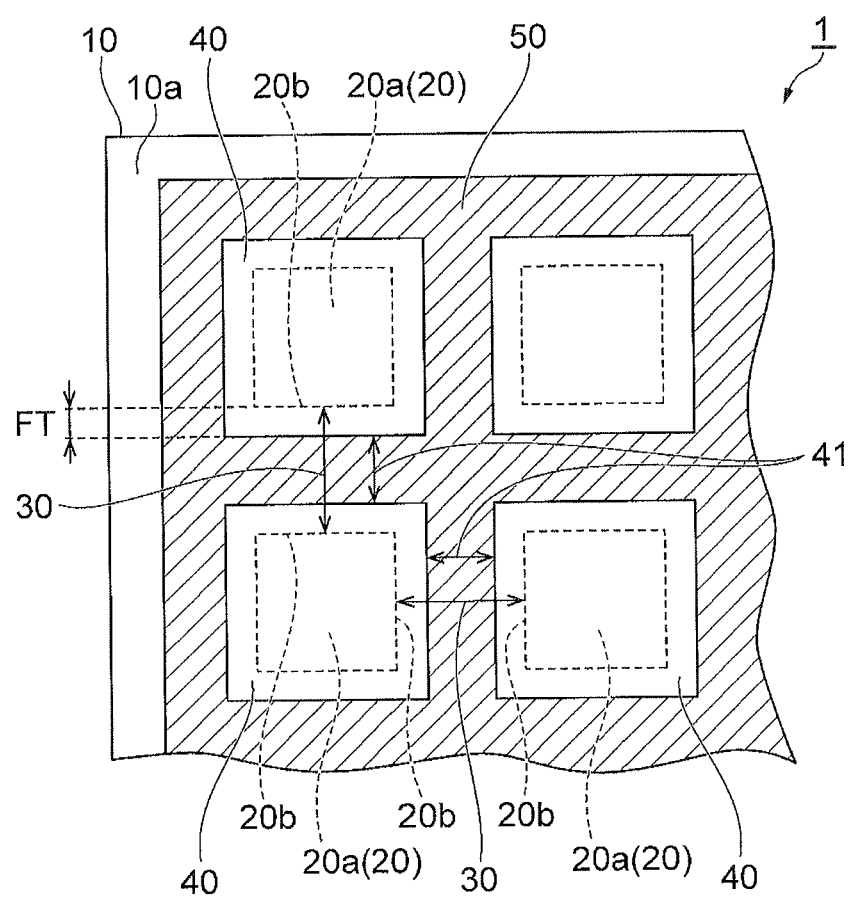
FIG. 2 is a partial plan view of the scintillator panel shown in FIG. 1.

First, a scintillator panel according to a first embodiment will be described. FIG. 1 is a side view of the scintillator panel according to the first embodiment. FIG. 2 is a partial plan view of the scintillator panel shown in FIG. 2. As shown in FIGS. 1 and 2, the scintillator panel 1 includes a rectangular substrate 10.

The substrate 10 has a front surface 10a and a back surface 10b facing each other. The substrate 10 has a concave-convex pattern Pa formed on the front surface 10a. As a material of the substrate 10, for example, metal such as Al or SUS (stainless steel), a resin film such as polyimide, polyethylene terephthalate, or polyethylene naphthalate, a carbon-based material such as amorphous carbon or carbon fiber reinforced plastic, an FOP (a Fiber Optic Plate: an optical device in which a large number of optical fibers with a diameter of several microns are bundled (for example, J5734 manufactured by Hamamatsu Photonics K.K.)), etc., may be used. As a material of the concave-convex pattern Pa, for example, a high-aspect resist such as epoxide resin (KMPR or SU-8 manufactured by Nippon Kayaku Co., Ltd., etc.), silicon, glass, or the like may be used. In particular, a material of the convex portions composing the concave-convex pattern Pa may be a material which is transmissive to scintillation light generated in a scintillator section 20 which will be described later.

The concave-convex pattern Pa is formed from a plurality of convex portions 11 and a concave portion 12 defined by the convex portions 11. That is, the plurality of convex portions 11 and concave portion 12 are formed on the substrate 10. Each of the convex portions 11 projects from the front surface 10a along a direction toward the front surface 10a from the back surface 10b of the substrate 10 (here, an incident direction of the radiation R, and a direction perpendicular to the front surface 10a and the back surface 10b of the substrate 10). Each of the convex portions 11 is formed into a rectangular parallelepiped. The convex portions 11 are arrayed periodically in a two-dimensional array on the front surface 10a of the substrate 10. Accordingly, the concave portion 12 defined by the convex portions 11 is a groove showing rectangular lattice-shapes in planar view.

With respect to the respective dimensions of this concave-convex pattern Pa, a width (groove width) W of the concave portion 12 may be set to approximately 35 µm in the case where a pitch (a cycle of forming the convex portions 11) P between the convex portions 11 is approximately 100 µm, the width W of the concave portion 12 may be set to approximately 20 µm to 40 µm in the case where the pitch P between the convex portions 11 is approximately 127 µm, and the width W of the concave portion 12 may be set to approximately 50 µm to 70 µm in the case where the pitch P between the convex portions 11 is approximately 200 µm. Further, a height H of the convex portion 11 may be set to approximately 2.5 µm to 50 µm. In particular, in the present embodiment, the pitch P between the convex portions 11 is approximately 127 µm, the width W of the concave portion 12 is approximately 45 µm, and the height H of the convex portion 11 is approximately 15 µm.

The scintillator panel 1 includes a plurality of scintillator sections 20. The scintillator sections 20 are formed by a plurality of columnar crystals C standing in a forest-like manner, and there are gaps of approximately several µm among the columnar crystals C. The plurality of scintillator sections 20 are separated from one another. The scintillator sections 20 are respectively formed on upper surfaces 11a of the convex portions 11. Accordingly, the scintillator panel 1 includes the scintillator sections 20 the number of which corresponds to the number of the convex portions 11. The scintillator section 20 has an upper surface 20a, and side surfaces 20b extending from the upper surface 20a toward the front surface 10a of the substrate 10 so as to reach the upper surface 11a of the convex portion 11. The scintillator section 20 may be formed of a scintillator material forming columnar crystals such as CsI (cesium iodide), for example.

The scintillator section 20 extends along the incident direction of the radiation R (a direction substantially vertical to the substrate 10) from the upper surface 11a of the convex portion 11. More specifically, the scintillator section 20 is composed of a plurality of columnar crystals C of a scintillator material extending along the incident direction of the radiation R from the upper surface 11a of the convex portion 11. The columnar crystal C composing the scintillator section 20 may show a tapered shape so as to expand its diameter with increasing distance from the upper surface 11a of the convex portion 11. In addition, a height (scintillator film thickness) T of the scintillator section 20 may be, for example, approximately 100 µm to 600 µm. In addition, by selecting a radiation (X-rays) transmissive base member as the substrate 10, it is possible to allow the radiation R to be incident from the back surface 10b of the substrate 10.

Here, as described above, because the scintillator sections 20 are separated from one another, gaps 30 are formed between the side surfaces 20b of the scintillator sections 20 adjacent to one another. That is, the scintillator sections 20 are sectioned with the gaps 30, to be separate from one another. Then, the gaps 30 are greater in width than gaps among the plurality of columnar crystals C composing the scintillator sections 20. Here, the gap 30 extends from the upper end portion including the upper surface 20a of the scintillator section 20 (the end portion on the opposite side of the convex portion 11) up to the base end portion of the scintillator section 20 in contact with the upper surface 11a of the convex portion 11 (the end portion on the convex portion 11 side), and continues to the concave portion 12. Accordingly, a width of the gap 30 is, for example, approximately the width W of the concave portion 12. The gaps 30 are, as will be described later, filled with a solvent permeation blocking film 40 and a light shielding layer 50.

The scintillator panel 1 includes the solvent permeation blocking film 40. The solvent permeation blocking film 40 is formed on the upper surfaces 20a and the side surfaces 20b of the scintillator sections 20 so as to cover the upper surfaces 20a and the side surfaces 20b of the scintillator sections 20. In particular, the solvent permeation blocking film 40 is formed so as not to fill the gaps 30 between the side surfaces 20b of the scintillator sections 20 adjacent to one another (that is, so as to keep the gaps 30). Accordingly, gaps 41 are formed between a portions of the solvent permeation blocking film 40 on the side surfaces 20b of the scintillator sections 20 adjacent to one another.

The gap 41 extends from the upper end portion up to the base end portion of the scintillator section 20, and continues to the concave portion 12. Here, because a thickness FT of the solvent permeation blocking film 40 gradually increases in thickness from the base end portion toward the upper end portion of the scintillator section 20, a width of the gap 41 gradually decreases from the base end portion toward the upper end portion of the scintillator section 20. The thickness FT of the solvent permeation blocking film 40 is to an extent so as not to fill the gap 30 as described above, and may be set to, for example, approximately 1 µm to 5 µm, and may be set to approximately 2 µm to 3 µm.

This solvent permeation blocking film 40 may be formed from, for example, (1) parylene (poly-para-xylene), (2) polyurea, (3) $SiO_2$ or SiO, (4) SiN, (5) an organic or inorganic hybrid film of the above-described (1) to (4), (6) an $Al_2O_3$ layer or an $MgF_2$ layer which is formed by an ALD (Atomic Layer Deposition) method, or the like.

The scintillator panel 1 includes a light shielding layer 50. The light shielding layer 50 is a light reflection layer reflecting scintillation light generated in the scintillator section 20, or a light absorbing layer absorbing scintillation light generated in the scintillator section 20. That is, the light shielding layer 50 is for shielding scintillation light generated in a predetermined scintillator section 20, to confine the scintillation light to the predetermined scintillator section 20.

For that, the light shielding layer 50 is formed on the solvent permeation blocking film 40 on the side surfaces 20b of the scintillator sections 20 so as to cover the side surfaces 20b of the scintillator sections 20. In particular, the light shielding layer 50 is formed so as to fill the gaps 30. More specifically, the light shielding layer 50 is formed so as to fill the gaps 41 defined in the gaps 30 by the solvent permeation blocking film 40.

Further, the light shielding layer 50 is formed in the concave portion 12 as well so as to fill the concave portions 12. Further, the light shielding layer 50 is not formed on the solvent permeation blocking film 40 on the upper surfaces 20a of the scintillator sections 20. That is, the light shielding layer 50 is formed on the solvent permeation blocking film 40 so as to cover the whole of the respective scintillator sections 20 except the upper end portions of the scintillator sections 20 (in other words, the respective scintillator sections 20 are covered with the solvent permeation blocking film 40 at the upper end portions thereof and are exposed from the light shielding layer 50).

This light shielding layer 50 may be composed of, for example, an ink, a coating material, or a paste containing organic pigment, inorganic pigment, or metallic pigment, or a metallic nano-ink containing metallic nanoparticles such as Ag, Pt, or Cu, or various types of dye compounds (hereinafter called "filling material"). Further, the light shielding layer 50 may be formed by forming a metallic film by an ALD method (Atomic Layer Deposition method), nonelectrolytic plating, or the like. In this way, provided that the light shielding layer 50 is fanned so as to cover the side surfaces 20b of the scintillator sections 20, it is possible to confine scintillation light generated in a predetermined scintillator section 20, to the predetermined scintillator section 20, which makes it possible to realize high brightness and high resolution.

The scintillator panel 1 composed as described above can be manufactured, for example, as follows. That is, first, a base member for the substrate 10 is prepared, and a material of the concave-convex pattern Pa is applied onto the base member and dried to be formed thereon. Next, the concave-convex pattern Pa is formed on the base member by photolithograph, to fabricate the substrate 10 having the concave-convex pattern Pa in desired dimensions. Or, the concave-convex pattern Pa may be formed on the base member by screen-printing. Next, the scintillator sections 20 are formed on the respective upper surfaces 11a of the convex portions 11 of the substrate 10 by utilizing a vapor deposition method and/or a laser processing method, etc. By controlling the respective vapor deposition conditions (a degree of vacuum, a vapor deposition rate, a substrate heating temperature, an angle of vapor flow, and the like), it is possible to fonni the scintillator sections 20 as described above on the concave-convex pattern Pa.

Next, the solvent permeation blocking film 40 is formed with a thickness so as not to fill the gaps 30 between the side surfaces 20b of the scintillator sections 20 adjacent to one another, on the upper surfaces 20a and the side surfaces 20b of the scintillator sections 20. The thickness FT of the solvent permeation blocking film 40 may be set to, for example, approximately 1 µm to 2 µm.

Then, the light shielding layer 50 is formed on the solvent permeation blocking film 40. More specifically, the light shielding layer 50 is formed by applying the above-described filling material onto the solvent permeation blocking film 40 (that is, by filing the gaps 30 (gaps 41) with the filling material) under vacuum. The scintillator panel 1 is manufactured by the above-described processes.

As described above, in the scintillator panel 1 according to the present embodiment, the plurality of scintillator sections 20 are formed on the substrate 10 so as to be separate from one another, and the solvent permeation blocking film 40 is formed on the side surfaces 20b and the upper surfaces 20a of the respective scintillator sections 20 so as not to fill the gaps 30 among those scintillator sections 20 (between the side surfaces 20b of the scintillator sections 20).

Then, in the scintillator panel 1 according to the present embodiment, the light shielding layer 50 is formed on the solvent permeation blocking film 40. Accordingly, at the time of forming the light shielding layer 50 so as to fill the gaps 30 between the scintillator sections 20 with a filling material, because the scintillator sections 20 are covered with the solvent permeation blocking film 40, a solvent or the like in the filling material does not permeate among the columnar crystals C composing the scintillator sections 20. Therefore, in accordance with this scintillator panel 1 according to the present embodiment, it is possible to prevent characteristic degradation associated with formation of the light shielding layer 50.

Further, if a solvent in the filling material permeates among the columnar crystals C composing the scintillator sections 20 at the time of forming the light shielding layer 50, the viscosity of the filling material is increased, and the gaps 30 may not be appropriately filled with the filling material in some cases. In accordance with the scintillator panel 1 according to the present embodiment, because it is prevented that a solvent in the filling material permeates among the columnar crystals C, such a problem is not caused in any case, and it is possible to appropriately fill the gaps 30 with the filling material.

[Second Embodiment]

Figure 3:
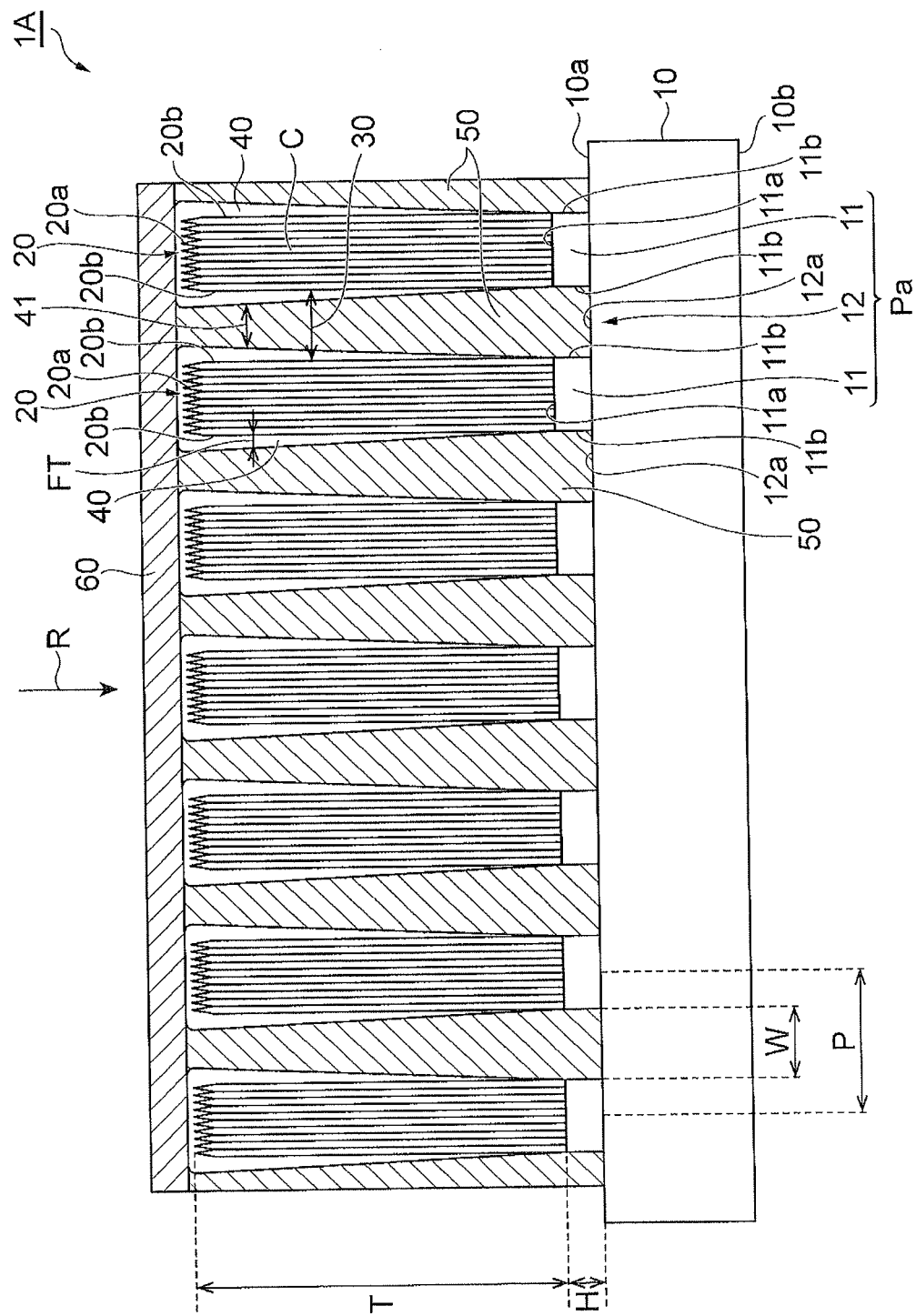
FIG. 3 is a side view of a scintillator panel according to a second embodiment.

Next, a scintillator panel according to a second embodiment will be described. FIG. 3 is a side view of the scintillator panel according to the second embodiment. As shown in FIG. 3, a scintillator panel 1A according to the present embodiment is, as compared with the scintillator panel 1 according to the first embodiment, different in the point that the scintillator panel 1A further includes a light shielding layer 60. The light shielding layer 60 is, in the same way as the light shielding layer 50, for shielding scintillation light, and is a light reflection layer reflecting scintillation light, or a light absorbing layer absorbing scintillation light.

The light shielding layer 60 is formed on the solvent permeation blocking film 40 and the light shielding layer 50 so as to cover the solvent permeation blocking film 40 on the upper surfaces 20a of the scintillator sections 20 exposed form the light shielding layer 50 (that is, so as to cover the upper surfaces 20a of the scintillator sections 20). In addition, the light shielding layer 60 may be formed integrally with the light shielding layer 50, or may be formed separately from the light shielding layer 50. Further, the light shielding layer 50 may be formed from a material which is the same as that of the light shielding layer 50, or may be formed from a material different from that of the light shielding layer 50.

This scintillator panel 1A may be manufactured such that, after the scintillator panel 1 is manufactured as described above, the filling material disposed on the solvent permeation blocking film 40 on the upper surfaces 20a of the scintillator sections 20 are removed, and thereafter a predetermined material (for example, the above-described filling material) is applied onto the solvent permeation blocking film 40 and the light shielding layer 50, to form the light shielding layer 60.

In accordance with the scintillator panel 1A according to the present embodiment, in the same way as the scintillator panel 1 according to the first embodiment, it is possible to prevent permeation of a solvent or the like among the columnar crystals C at the time of forming the light shielding layers 50 and 60. Further, in accordance with the scintillator panel 1A according to the present embodiment, by further providing the light shielding layer 60, it is possible to securely confine scintillation light generated in a predetermined scintillator section 20, to the predetermined scintillator section 20.

[Third Embodiment]

Figure 4:
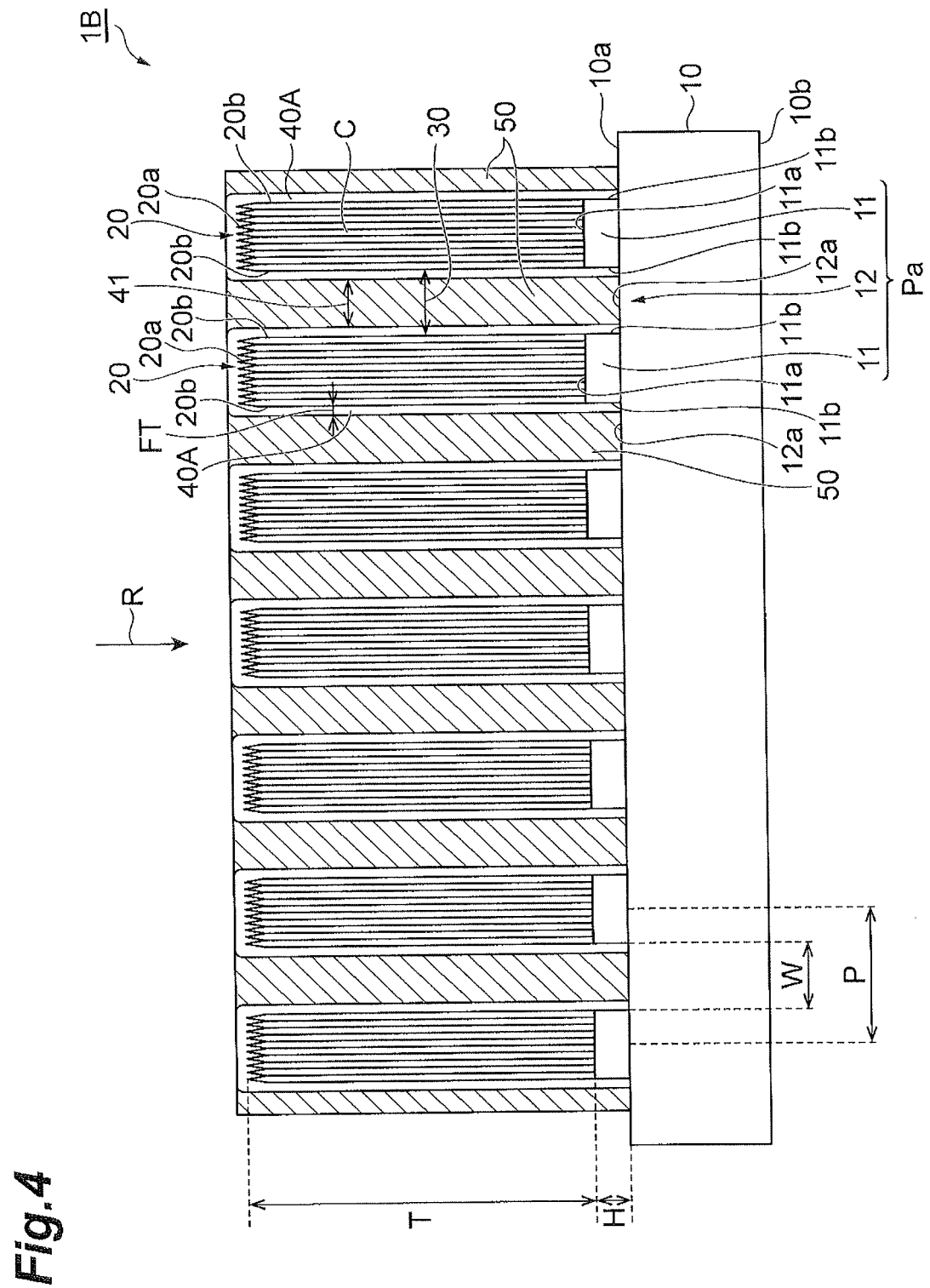
FIG. 4 is a side view of a scintillator panel according to a third embodiment.

Next, a scintillator panel according to a third embodiment will be described. FIG. 4 is a side view of the scintillator panel according to the third embodiment. As shown in FIG. 4, a scintillator panel 1B according to the present embodiment is, as compared with the scintillator panel 1 according to the first embodiment, different in the point that the scintillator panel 1B includes solvent permeation blocking film 40A in place of the solvent permeation blocking film 40. In addition, in the same way as the first embodiment, by selecting a radiation (X-rays) transmissive base member as the substrate 10, it is possible to allow the radiation R to be incident from the back surface 10b of the substrate 10.

The solvent permeation blocking film 40A is formed on the upper surfaces 20a and the side surfaces 20b of the scintillator sections 20 and the side surfaces 11b of the convex portions 11 so as to cover the upper surfaces 20a and the side surfaces 20b of the scintillator sections 20 and the side surfaces 11b of the convex portions 11. In particular, the solvent permeation blocking film 40A is formed so as not to fill the gaps 30 between the side surfaces 20b of the scintillator sections 20 adjacent to one another (that is, so as to keep the gaps 30). Further, the solvent permeation blocking film 40A is formed successively from the upper end portion of the scintillator section 20 up to the bottom surface 12a of the concave portion 12, and covers the boundary portion between the base end portion of the scintillator section 20 and the upper surface 11a of the convex portion 11.

In the present embodiment, because a thickness FT of the solvent permeation blocking film 40A is substantially constant, a width of the gap 41 defined by the solvent permeation blocking film 40A as well is substantially constant. The thickness FT of the solvent permeation blocking film 40A may be set to, for example, approximately 1 μm to 5 μm, and may be set to approximately 2 μm to 3 μm. The solvent permeation blocking film 40A as described above may be formed from a material which is the same as that of the solvent permeation blocking film 40 according to the first embodiment by the same method.

In the scintillator panel 1B according to the present embodiment, the solvent permeation blocking film 40A is formed, not only on the upper surface 20a and the side surfaces 20b of the scintillator section 20, but also on the side surfaces 11b of the convex portion 11. In particular, the solvent permeation blocking film 40A covers the boundary portion between the base end portion of the scintillator section 20 and the upper surface 11a of the convex portion 11. Therefore, in accordance with the scintillator panel 1B according to the present embodiment, it is possible to securely prevent permeation of a solvent or the like among the columnar crystals C at the time of forming the light shielding layer 50. Further, the side surfaces 11b of the convex portion 11 as well are covered with the solvent permeation blocking film 40A, thereby it is possible to prevent degradation of the convex portion 11 by a solvent component contained in the filling material.

[Fourth Embodiment]

Figure 5:
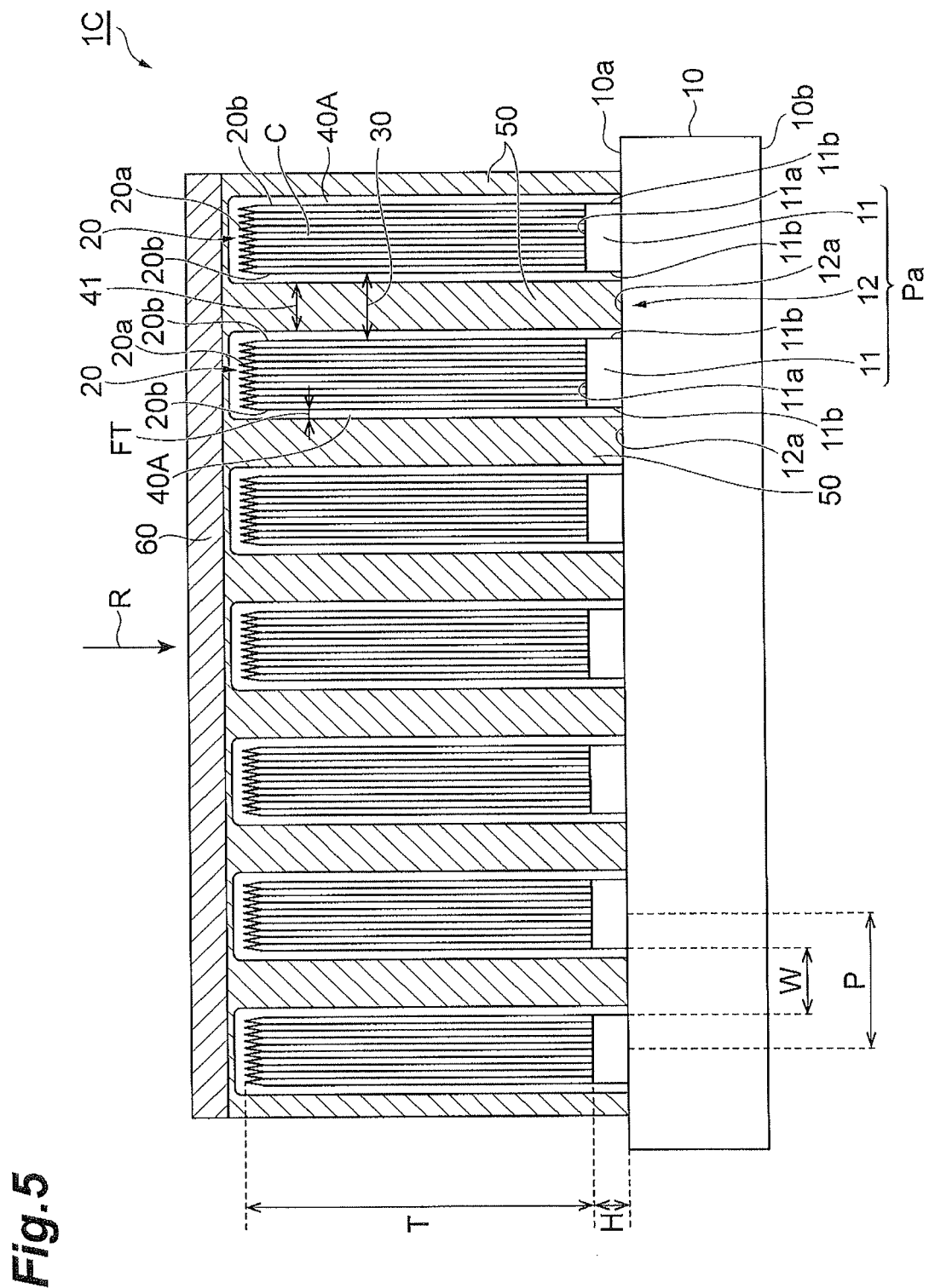
FIG. 5 is a side view of a scintillator panel according to a fourth embodiment.

Next, a scintillator panel according to a fourth embodiment will be described. FIG. 5 is a side view of the scintillator panel according to the fourth embodiment. As shown in FIG. 5, a scintillator panel 1C according to the present embodiment is, as compared with the scintillator panel 1B according to the third embodiment, different in the point that the scintillator panel 1C further includes a light shielding layer 60.

In this way, in accordance with the scintillator panel 1C according to the present embodiment, in the same way as the scintillator panel 1B according to the third embodiment, it is possible to securely prevent permeation of a solvent or the like among the columnar crystals C, and in the same way as the scintillator panel 1B according to the second embodiment, it is possible to securely confine scintillation light.

[Fifth Embodiment]

Figure 6:
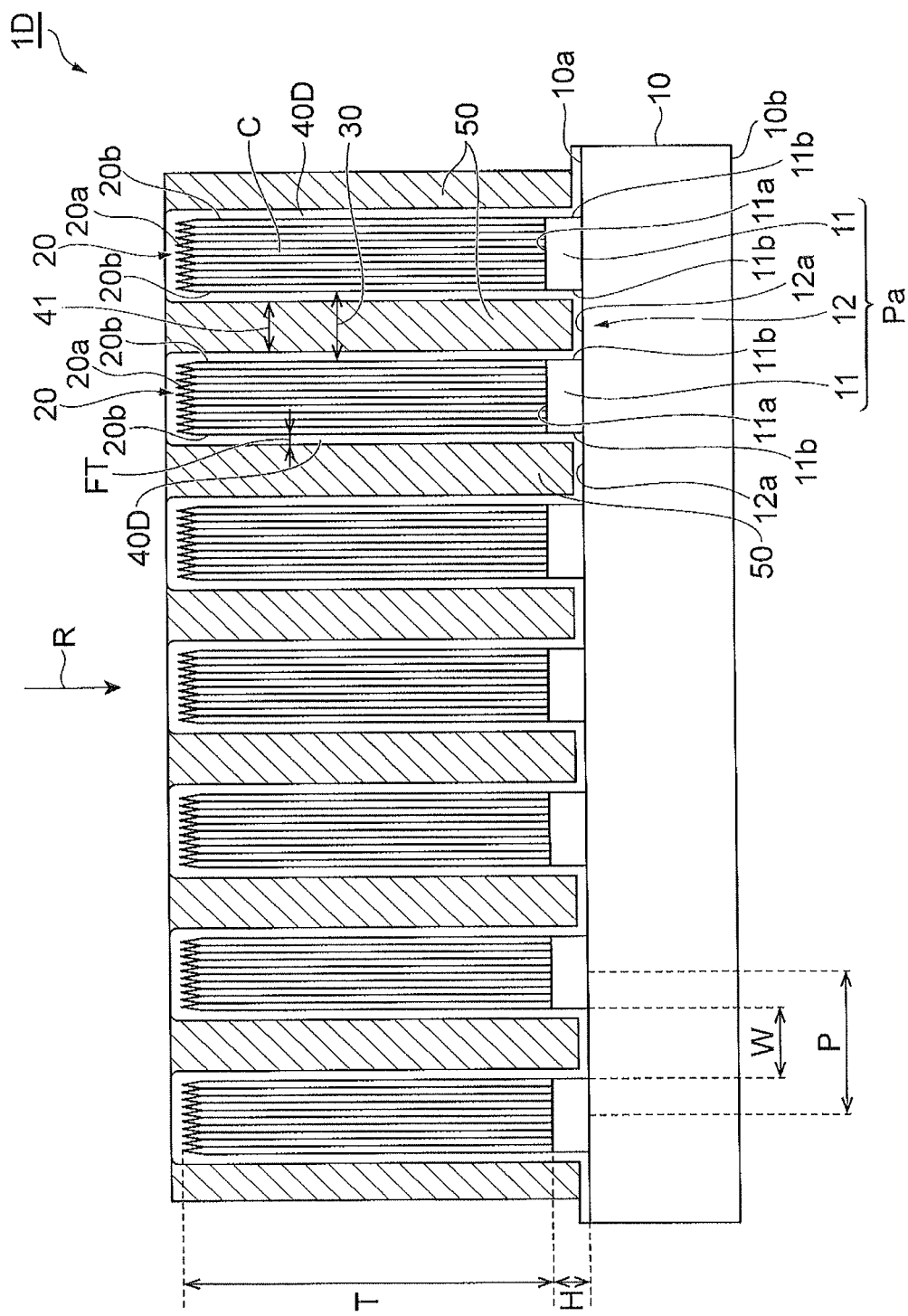
FIG. 6 is a side view of a scintillator panel according to a fifth embodiment.

Next, a scintillator panel according to a fifth embodiment will be described. FIG. 6 is a side view of the scintillator panel according to the fifth embodiment. As shown in FIG. 6, a scintillator panel 1D according to the present embodiment is, as compared with the scintillator panel 1B according to the third embodiment, different in the point that the scintillator panel 1D includes a solvent permeation blocking film 40D in place of the solvent permeation blocking film 40A. In addition, in the same way as the third embodiment, by selecting a radiation (X-rays) transmissive base member as the substrate 10, it is possible to allow the radiation R to be incident from the back surface 10b of the substrate 10.

The solvent permeation blocking film 40D is formed on the upper surfaces 20a and the side surfaces 20b of the scintillator sections 20, the side surfaces 11b of the convex portions 11, and the bottom surface 12a of the concave portion 12, so as to cover the upper surfaces 20a and the side surfaces 20b of the scintillator sections 20, the side surfaces 11b of the convex portions 11, and the bottom surface 12a of the concave portion 12. In particular, the solvent permeation blocking film 40D is formed so as not to fill the gaps 30 between the side surfaces 20b of the scintillator sections 20 adjacent to one another (that is, so as to keep the gaps 30).

In contrast with that the solvent permeation blocking film 40 and 40A are formed so as to be divided into a plurality of portions covering the respective scintillator sections 20, the solvent permeation blocking film 40D is integrally formed as a single portion. That is, the solvent permeation blocking film 40D is formed such that a portion covering a scintillator section 20 and its convex portion 11 and portions covering other scintillator sections 20 and their convex portions 11 are continued on the bottom surface 12a of the concave portion 12.

In the present embodiment as well, because a thickness FT of the solvent permeation blocking film 40D is substantially constant, a width of the gap 41 defined by the solvent permeation blocking film 40D as well is substantially constant. The thickness FT of the solvent permeation blocking film 40D may be set to, for example, approximately 1 µm to 5 µm, and may be set to approximately 2 µm to 3 µm. The solvent permeation blocking film 4013 as described above may be formed from a material which is the same as that of the solvent permeation blocking film 40 in the first embodiment by the same method.

In accordance with the scintillator panel 1D according to the present embodiment, the solvent permeation blocking film 40D is formed on the bottom surface 12a of the concave portion 12 as well. Therefore, it is possible to more securely prevent permeation of a solvent or the like among the columnar crystals C. Further, because the solvent permeation blocking film 40D is not divided into a plurality of portions, but integrally configured, it is easy to form the solvent permeation blocking film 40D. Further, the side surfaces 11b of the convex portions 11 as well are covered with the solvent permeation blocking film 40D, thereby it is possible to prevent degradation of the convex portions 11 by a solvent component contained in the filling material. Moreover, the front surface 10a of the substrate 10 (the bottom surface 12a of the concave portion 12) as well are covered with the solvent permeation blocking film 40D, thereby it is possible to protect the substrate 10 from a solvent component.

[Sixth Embodiment]

Figure 7:
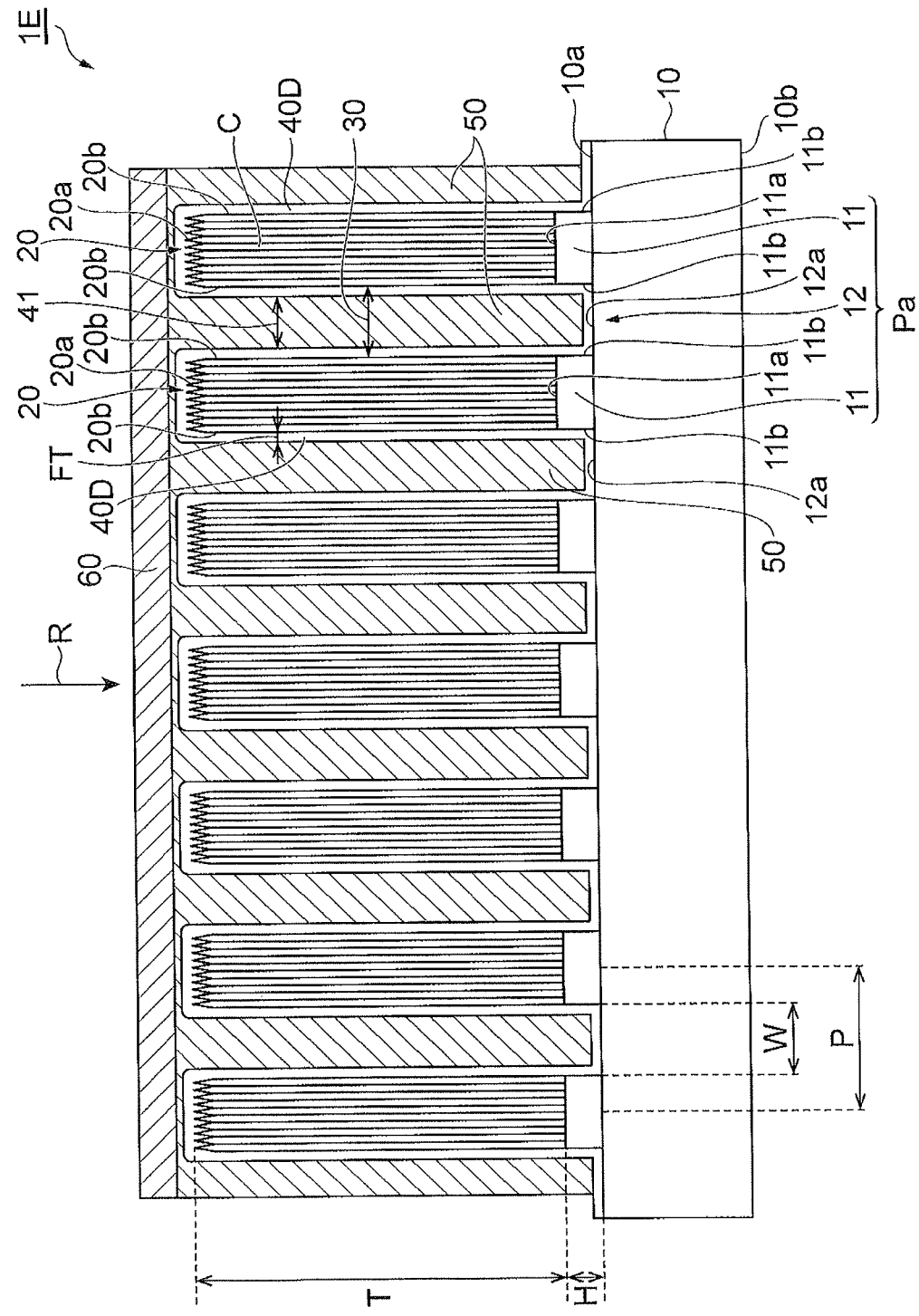
FIG. 7 is a side view of a scintillator panel according to a sixth embodiment.

Next, a scintillator panel according to a sixth embodiment will be described. FIG. 7 is a side view of the scintillator panel according to the sixth embodiment. As shown in FIG. 7, a scintillator panel 1E according to the present embodiment is, as compared with the scintillator panel 1D according to the fifth embodiment, different in the point that the scintillator panel 1E further includes the light shielding layer 60.

In this way, in accordance with the scintillator panel 1E according to the present embodiment, in the same way as the scintillator panel 1D according to the fifth embodiment, it is possible to more securely prevent permeation of a solvent or the like among the columnar crystals C, which makes it easy to form the solvent permeation blocking film 40D. Moreover, in accordance with the scintillator panel 1E according to the present embodiment, in the same way as the scintillator panel 1B according to the second embodiment, it is possible to securely confine scintillation light.

The above-described embodiments have been described as an embodiment of a scintillator panel according to an aspect of the present invention. Accordingly, an aspect of the present invention is not limited to the above-described scintillator panels 1 to 1E. An aspect of the present invention makes it possible so as to arbitrarily change the above-described scintillator panels 1 to 1 E, or to be applied to another one within the range without changing the gist of the respective Claims.

For example, the scintillator panels 1 to 1E according to the above-described embodiments may further include a moisture-proofing film. In such a case, in the scintillator panels 1 to 1E, the moisture-proofing film may be deposited-formed by parylene or the like on the solvent permeation blocking films 40, 40A, and 40D, the light shielding layer 50, and the light shielding layer 60 so as to cover the solvent permeation blocking films 40, 40A, and 40D, the light shielding layer 50, and the light shielding layer 60 (that is, so as to cover the whole of the scintillator sections 20). Provided that a moisture-proofing film is further provided in this way, the moisture resistance of the scintillator sections 20 is improved.

Further, in the scintillator panels 1 to 1E according to the above-described embodiments, the scintillator sections 20 are to be formed on the convex portions 11 of the substrate 10. Meanwhile, a mode of formation of the scintillator sections 20 is not limited thereto, and for example, the scintillator sections 20 may be formed on the front surface of an arbitrary substrate on which convex portions are not formed.

Moreover, in the above-described embodiments, the case where an aspect of the present invention is applied to a scintillator panel has been described. Meanwhile, an aspect of the present invention is applicable to a radiation detection device including the above-described scintillator panel or the like. In such a case, the radiation detection device includes any one of the above-described scintillator panels 1 to 1E, and the substrate 10 thereof may be a sensor panel including a plurality of photoelectric conversion elements arrayed so as to be optically coupled to the scintillator sections 20 (a TFT panel or a CMOS image sensor panel).

In such a case, for example, the convex portions 11 respectively corresponding to the respective pixels of an TFT panel or a CMOS image sensor serving as the substrate 10 are formed, and the scintillator section 20 is formed thereon. A material and a method of forming the convex portions 11 are as described above. At that time, each of the convex portions 11 may be composed of a material transmissive to scintillation light generated in the scintillator section 20.

In accordance with this radiation detection device, because the radiation detection device includes one of the above-described scintillator panels 1 to 1E, it is possible to suppress characteristic degradation associated with formation of the light shielding layer 50. Further, because the substrate 10 is a sensor panel including the photoelectric conversion elements, provided that the convex portions 11 are directly formed on the photoelectric conversion elements, to provide the scintillator sections 20, there is no need to paste together a scintillator panel and a sensor panel separately prepared.

INDUSTRIAL APPLICABILITY

In accordance with an aspect of the present invention, it is possible to provide a scintillator panel and a radiation detection device which are capable of preventing characteristic degradation associated with formation of a light shielding layer.

REFERENCE SIGNS LIST 1, 1A, 1B, 1C, 1D, 1E . . . scintillator panel, 10 . . . substrate (sensor panel), 10$a$ . . . front surface, 10$b$ . . . back surface, 11 . . . convex portion, 11$a$ . . . upper surface, 11$b$ . . . side surface, 12 . . . concave portion, 12$a$ . . . bottom surface, 20 . . . scintillator section, 20$a$ . . . upper surface, 20$b$ . . . side surface, 30 . . . gap, 40, 40A, 40D . . . solvent permeation blocking film, 50 . . . light shielding layer, 60 . . . light shielding layer, C . . . columnar crystal, R . . . radiation.

The invention claimed is:

1. A scintillator panel for converting radiation into scintillation light, the scintillator panel comprising:
a substrate having a front surface and a back surface;
a plurality of scintillator sections formed on the front surface of the substrate so as to be separate from one another, and having upper surfaces and side surfaces extending from the upper surfaces toward the front surface of the substrate;
a solvent permeation blocking film formed on the upper surfaces and the side surfaces of the scintillator sections so as to cover the upper surfaces and the side surfaces of the scintillator sections; and
a light shielding layer formed on the solvent permeation blocking films, and for shielding the scintillation light;
wherein each scintillator section is composed of a plurality of columnar crystals of a scintillator material,
the solvent permeation blocking film is formed so as not to fill gaps between the side surfaces of the scintillator sections adjacent to one another,
the light shielding layer is formed on the solvent permeation blocking films on the side surfaces of the scintillator sections so as to fill the gaps,
the solvent permeation blocking film is integrally formed on both the upper surface and the side surface of each scintillator section and the solvent permeation blocking film is transparent to scintillation light,
the gap between the portions of the solvent permeation blocking film on the side surfaces of the scintillator section is tapered and
the scintillator sections are formed periodically in a two-dimensional array.

2. The scintillator panel according to claim 1, wherein the light shielding layer is formed on the solvent permeation blocking film on the side surfaces of the scintillator sections, so as to cover the side surfaces of the scintillator sections.

3. The scintillator panel according to claim 1, wherein the light shielding layer is further formed on the solvent permeation blocking film on the upper surfaces of the scintillator sections, so as to cover the upper surfaces of the scintillator sections.

4. The scintillator panel according to claim 1, wherein a plurality of convex portions are formed periodically in a two-dimensional array and projecting from the front surface in a direction from the back surface toward the front surface of the substrate, and concave portion defined by the convex portions are formed on the substrate, and
the scintillator sections are respectively formed on the upper surfaces of the convex portions.

5. The scintillator panel according to claim 4, wherein the solvent permeation blocking film is further formed on side surfaces of the convex portions so as to cover the side surfaces of the convex portions.

6. The scintillator panel according to claim 4, wherein the solvent permeation blocking film is further formed on a bottom surface of the concave portion so as to cover the bottom surface of the concave portion.

7. A radiation detection device comprising:
a substrate having a plurality of photoelectric conversion elements, a front surface, and a back surface;
a plurality of scintillator sections formed on the front surface of the substrate so as to be separate from one another, and having upper surfaces and side surfaces extending from the upper surfaces toward the front surface of the substrate, the scintillator sections optically coupled to the photoelectric conversion elements,
a solvent permeation blocking film formed on the upper surfaces and the side surfaces of the scintillator sections so as to cover the upper surfaces and the side surfaces of the scintillator sections; and
a light shielding layer formed on the solvent permeation blocking films, and for shielding the scintillation light;
wherein each scintillator section is composed of a plurality of columnar crystals of a scintillator material,
the solvent permeation blocking film is formed so as not to fill gaps between the side surfaces of the scintillator sections adjacent to one another, and
the light shielding layer is formed on the solvent permeation blocking films on the side surfaces of the scintillator sections so as to fill the gaps,
the solvent permeation blocking film is integrally formed on both the upper surface and the side surface of each scintillator section and the solvent permeation blocking film is transparent to scintillation light,
the gap between the portions of the solvent permeation blocking film on the side surfaces of the scintillator section is tapered, and
the scintillator sections are formed periodically in a two-dimensional array.

8. The radiation detection device according to claim 7, wherein the light shielding layer is formed on the solvent permeation blocking film on the side surfaces of the scintillator sections, so as to cover the side surfaces of the scintillator sections.

9. The radiation detection device according to claim 7, wherein the light shielding layer is further formed on the solvent permeation blocking film on the upper surfaces of the scintillator sections, so as to cover the upper surfaces of the scintillator sections.

10. The radiation detection device according to claim 7, wherein a plurality of convex portions are formed periodically in a two-dimensional array and projecting from the front surface in a direction from the back surface toward the front surface of the substrate, and concave portion defined by the convex portions are formed on the substrate,
the convex portions are formed so as to correspond to each of the photoelectric conversion elements, and
the scintillator sections are respectively formed on the upper surfaces of the convex portions.

11. The radiation detection device according to claim 10, wherein the solvent permeation blocking film is further formed on side surfaces of the convex portions so as to cover the side surfaces of the convex portions.

12. The radiation detection device according to claim 10, wherein the solvent permeation blocking film is further formed on a bottom surface of the concave portion so as to cover the bottom surface of the concave portion.

* * * * *